(12) United States Patent  
Hashimoto et al.

(10) Patent No.: US 8,797,606 B2  
(45) Date of Patent: Aug. 5, 2014

(54) PHOTOELECTRIC CONVERSION DEVICE, SENSOR CONTROL CIRCUIT, IMAGE READING DEVICE, AND IMAGE FORMING APPARATUS

(75) Inventors: Hideki Hashimoto, Kawasaki (JP); Masamoto Nakazawa, Kawasaki (JP)

(73) Assignee: Ricoh Company, Limited, Tokyo (JP)

( * ) Notice: Subject to any disclaimer, the term of this patent is extended or adjusted under 35 U.S.C. 154(b) by 424 days.

(21) Appl. No.: 12/850,133

(22) Filed: Aug. 4, 2010

(65) Prior Publication Data

US 2011/0051201 A1 Mar. 3, 2011

(30) Foreign Application Priority Data

Sep. 2, 2009 (JP) ................... 2009-202460

(51) Int. Cl.
- *H04N 1/40* (2006.01)
- *H04N 1/04* (2006.01)
- *H04N 5/372* (2011.01)

(52) U.S. Cl.
USPC ............................. 358/443; 358/474; 358/445

(58) Field of Classification Search
CPC .... H04N 5/3692; H04N 5/372; H04N 5/3765
USPC ............... 358/1.9, 1.14, 1.15, 3.01, 443, 474, 358/515, 521, 1.1–1.18; 348/245, 247
See application file for complete search history.

(56) References Cited

U.S. PATENT DOCUMENTS

| | | | | |
|---|---|---|---|---|
| 4,649,430 A * | 3/1987 | Hynecek | ........................ | 348/245 |
| 4,731,665 A * | 3/1988 | Hashimoto et al. | ............ | 348/247 |
| 6,937,361 B1 * | 8/2005 | Kondo et al. | .................. | 358/1.9 |
| 7,538,809 B2 | 5/2009 | Takaki et al. | | |
| 7,733,721 B2 * | 6/2010 | Tabata | ........................... | 365/201 |
| 8,248,669 B2 * | 8/2012 | Nakazawa | ..................... | 358/443 |
| 2003/0156105 A1 * | 8/2003 | Yokomichi et al. | ........... | 345/204 |
| 2007/0030532 A1 * | 2/2007 | Fujioka et al. | ................ | 358/474 |
| 2007/0120989 A1 | 5/2007 | Minami et al. | | |
| 2007/0146821 A1 * | 6/2007 | Joh | ............................... | 358/482 |
| 2008/0180541 A1 * | 7/2008 | Yonemitsu | ................. | 348/222.1 |
| 2008/0297616 A1 | 12/2008 | Nagase et al. | | |

FOREIGN PATENT DOCUMENTS

| | | |
|---|---|---|
| CN | 1443004 A | 9/2003 |
| CN | 1829292 A | 9/2006 |
| JP | 63-288578 | 11/1988 |
| JP | 03-094586 | 4/1991 |
| JP | 9-247394 | 9/1997 |
| JP | 2002-176528 | 6/2002 |

(Continued)

OTHER PUBLICATIONS

Combined Chinese Office Action and Search Report issued Nov. 2, 2012, in Chinese Patent Application No. 201010267351.0.

(Continued)

*Primary Examiner* — King Poon  
*Assistant Examiner* — Ibrahim Siddo  
(74) *Attorney, Agent, or Firm* — Oblon, Spivak, McClelland, Maier & Neustadt, L.L.P.

(57) ABSTRACT

The photoelectric conversion device includes a photoelectric conversion element configured to convert light reflected from an original image to electrical signals and a clock generator configured to generate driving signals for driving the photoelectric conversion element from a reference clock. Each of the driving signals is generated using the same logic gate or substantially the same logic gate.

10 Claims, 11 Drawing Sheets

(56) References Cited

FOREIGN PATENT DOCUMENTS

| JP | 2004-254080 | 9/2004 |
|----|-------------|--------|
| JP | 2007-214728 | 8/2007 |
| JP | 2009-10931  | 1/2009 |

OTHER PUBLICATIONS

Japanese Office Action issued on May 14, 2013 in the counterpart Japanese Application No. 2009-202460 filed on Sep. 2, 2009.

* cited by examiner

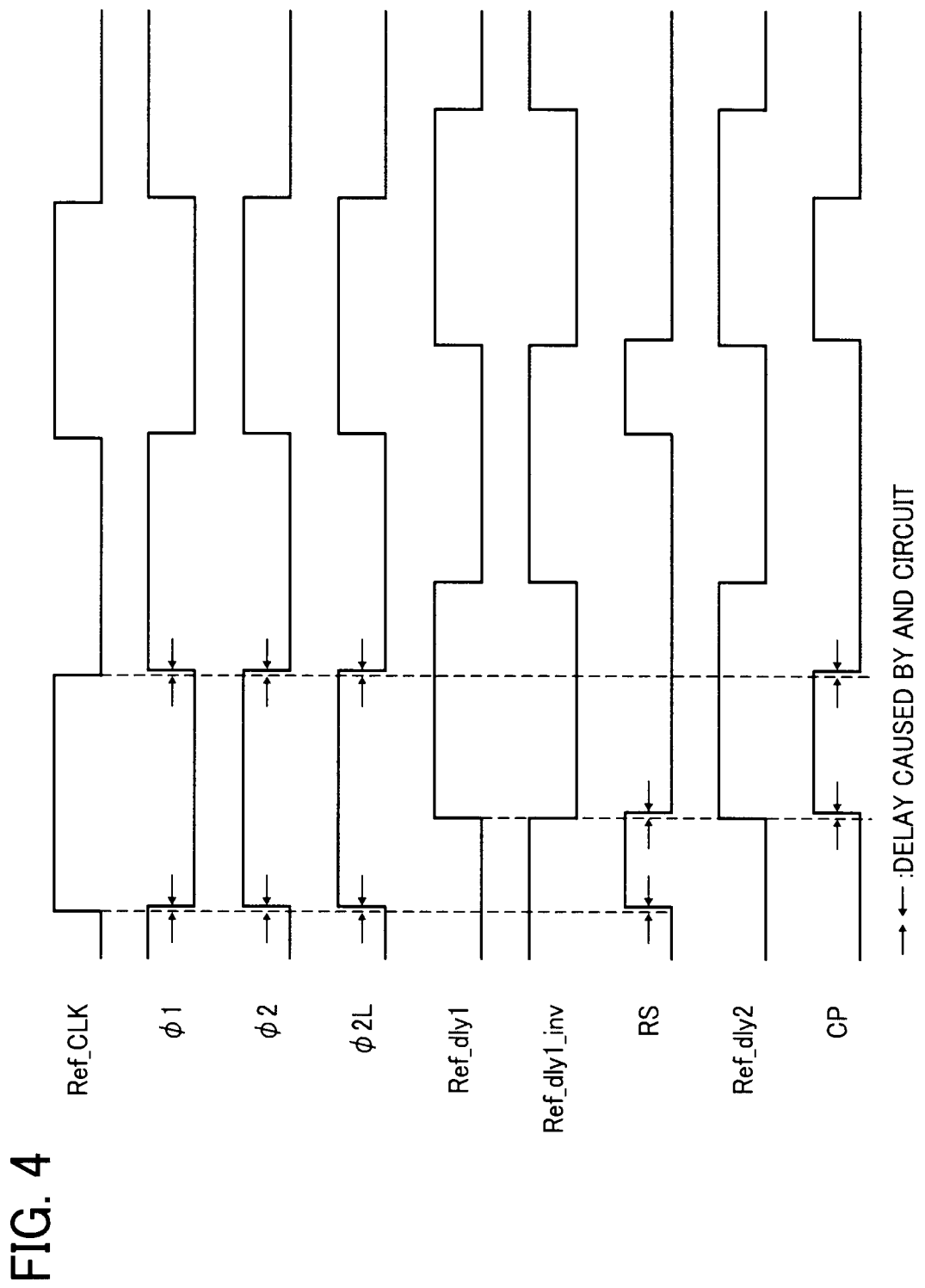

SOLID LINE : SIGNAL WITH VARIATION
DOTTED LINE : SIGNAL WITHOUT VARIATION

SOLID LINE : SIGNAL WITH VARIATION
DOTTED LINE : SIGNAL WITHOUT VARIATION

φ1–φ2 TIMING CONSTRAINT
(DIFFERENTIAL VOLTAGE WIDTH, CROSSPOINT)

φ1–φ2L TIMING CONSTRAINT
(DIFFERENTIAL VOLTAGE WIDTH, CROSSPOINT)

φ2L–RS–CP TIMING CONSTRAINT

TIMING OF SIGNALS IN TIMING GENERATOR
($\phi$2L BASIS)

SOLID LINE : SIGNAL WITH VARIATION
DOTTED LINE : SIGNAL WITHOUT VARIATION

TIMING OF SIGNALS AT CCD INPUT TERMINAL
($\phi$2L BASIS)

PHOTOELECTRIC CONVERSION DEVICE, SENSOR CONTROL CIRCUIT, IMAGE READING DEVICE, AND IMAGE FORMING APPARATUS

BACKGROUND OF THE INVENTION

1. Field of the Invention

The present invention relates to a photoelectric conversion device, and to a sensor control circuit, and an image reading device using the photoelectric conversion device. In addition, the present invention also relates to an image forming apparatus using the image reading device.

2. Discussion of the Related Art

There is market demand for a photoelectric conversion device capable of performing high speed CCD driving.

FIG. 10 is a view illustrating flow of signals in a sensor board unit for use in a related-art image reading device. A case where the image reading device is a scanner will be described.

The scanner reads an image of an original document by irradiating the image with light, and then subjecting light reflected from the original document to photoelectric conversion in a charge coupled device (CCD) 1003 disposed on a sensor board unit (SBU) 1000 to obtain electric signals of the image. The SBU includes as main components the CCD 1003 subjecting light reflected from the original document to photoelectric conversion, an analog front end (AFE) 1006 subjecting the electrical signals output from the CCD to a variety of analog processings, a timing generator (TG) 1001 generating a driving signal for driving the CCD 1003 and AFE 1006, and a CCD driver 1002 driving the CCD 1003. In FIG. 10, reference numerals 1004 and 1005 denote a buffer circuit and a condenser, respectively.

Driving signals CCD_CLK and AFE_CLK needed for driving the CCD 1003 and AFE 1006, respectively, and a variety of gate signals (hereinafter referred to collectively as GATE) are generated by the TG 1001, and then input to the CCD and the AFE, respectively. The CCD driving signal generated by the TG 1001 is supplied to the CCD 1003 via the CCD driver 1002, and the CCD subjects light reflected from an original document to photoelectric conversion to output an analog electric signal. The thus-output analog electric signal is input to the condenser 1005 via the buffer circuit 1004 (constituted of an emitter follower circuit) to be subjected to AC coupling, and then input to the AFE 1006.

In the AFE 1006, the reference black level is corrected to an internal reference voltage by a clamping portion, and image signals are sampled in a sample hold portion, followed by amplification in an amplification portion and AD conversion in an A/D converter, resulting in output of digital image data (D_sig in FIG. 10).

FIG. 11 is a block diagram illustrating a related-art image reading device.

Referring to FIG. 11, CCD driving signals (ph1, ph2, ph21, rs, and cp) generated in the TG 1001 having a clock generator (CLK_gen) 1007 are input to the CCD 1003 as $\phi1$, $\phi2$, $\phi2L$, RS, and CP via the CCD driver 1002. In this regard, reference character $\phi1/\phi2$ denotes transfer clocks for subjecting signal charges produced in a photodiode (PD) (not shown) in the CCD 1003 to charge transfer on an analog shift register, and $\phi2L$ denotes a last-step transfer clock.

In addition, reference character RS denotes a reset signal for resetting signal charges accumulated in a floating capacitor (FJ), which detects a signal charge transferred to an output step, to an initial state. CP denotes a clamp signal for adjusting (clamping) the basis of the signal output from the CCD 1003 so as to be any voltage. In addition to the signals mentioned above, there is a shift gate signal for use in transferring a signal charge produced in the photodiode (PD) to the analog shift register once per line, but the signal is not illustrated in FIG. 11.

The driving signals are generated in the clock generator (CLK_gen) 1007 of the TG 1001 so as to have any timing relation to each other.

Both buffer-type drivers and inverter-type drivers can be used for the driver 1002 of the CCD illustrated in FIG. 11. However, inverter-type drivers are preferable because they provide high-speed performance.

FIGS. 12A-12C are views illustrating the primary timing constraints on the CCD driving signals. Specifically, FIG. 12A illustrates a timing constraint on $\phi1$ and $\phi2$ (differential compression, crosspoint), FIG. 12B illustrates a timing constraint on $\phi1$ and $\phi2L$ (differential compression, crosspoint), and FIG. 12C illustrates a timing constraint on $\phi2L$, RS, and CP.

As illustrated in FIGS. 12A-12C, there are timing constraints on each signal or between two signals. For example, a minimum value to be secured is set to each of the HIGH-period width (t5) of RS and the width (t7) between $RS_\downarrow$ and $CP_\downarrow$. In order to drive the CCD 1003, all the constraints have to be satisfied even when the parts constituting the clock generator are varied. Similarly, a minimum value to be secured is also set to each of t1-t4, t6 and t8.

In addition, Vx1 is a standard concerning the crosspoints of $\phi1_\downarrow$-$\phi2_\uparrow$ and $\phi1_\uparrow$-$\phi2_\downarrow$, and there is a constraint such that a crosspoint is present at a voltage not lower than a predetermined voltage.

For example, when the $\phi2_\uparrow$ timing is delayed in FIG. 12A, the crosspoint of $\phi1_\downarrow$-$\phi2_\uparrow$ decreases. When the delay time of $\phi2_\uparrow$ increases, the Vx1 becomes lower than the predetermined voltage, and thereby the constraint cannot be satisfied. In this regard, in order to satisfy the constraint, the timing of $\phi1_\downarrow$-$\phi2_\uparrow$ and $\phi1_\uparrow$-$\phi2_\downarrow$ has to be adjusted to secure the crosspoint even when the timing varies. The same is true for the Vx2 concerning the crosspoints of $\phi1_\downarrow$-$\phi2_\uparrow$ and $\phi1_\uparrow$-$\phi2_\downarrow$.

By using the conventional method illustrated in FIG. 11, the timing of the signals output from the TG can be optimized, as illustrated in FIG. 13A. However, the timing of the signals at the input terminal of the CCD 1003 is widely varied depending on various factors concerning the circuit such as signal skews in the TG 1001 and CCD driver 1002, variation of resistors and capacitors, parasitic components of a transmission line (e.g., resistor/capacitor/inductor components), and capacitance of the terminal of the CCD 1003.

Specifically, the driving circuit of the CCD has to be designed so as to have a margin sufficient to satisfy all the timing restraints even when the above-mentioned factors vary, for example, in the manufacturing process thereof. However, when performing high speed driving, the timing margin cannot be secured, and therefore it becomes difficult to satisfy all the timing constraints.

In this regard, the CCD driver 1002 illustrated in FIG. 13B is of a buffer type. When an inverter type CCD driver is used therefor, the signals have polarities opposite to those of the signals illustrated in FIG. 13A.

In this case, when the CCD 1003 is driven, various timing constraints on each signal or any two signals have to be satisfied, for example, the signal timing between any two signals has to be secured in a time period not shorter than a predetermined time period.

However, as the CCD driving speed increases, it becomes difficult to satisfy the above-mentioned timing constraints. This is because there are various variation factors concerning the circuit such as signal skews in the TG 1001 and CCD driver 1002, variation of resistors and capacitors, parasitic components of a transmission line (e.g., resistor/capacitor/inductor components), and capacitance of the terminal of the CCD 1003.

Namely, the driving circuit of the CCD 1003 has to be designed so as to have a margin sufficient to satisfy all the timing restraints even when the above-mentioned factors vary worst, for example, in the manufacturing process thereof. However, since the timing margin cannot be secured in high speed driving, it becomes difficult to satisfy all the timing constraints.

In attempting to solve the problem, there is a known technique, in which a CCD driving signal generated in a timing generator is finely delayed in pieces to generate multiple delayed signals, and then a signal having a proper timing is selected from the multiple signals to optimize the timing between signals generated in the timing generator.

However, the above-mentioned technique can optimize only the timing of signals just after the signals are output from the timing generator (TG 1001), whereas the above-mentioned timing constraints should be satisfied at the input terminal of the CCD 1003. Namely, since the signals output from the timing generator (TG 1001) are affected by the variation factors present between the TG 1001 and the CCD 1003, variation of the signal timing at the input terminal of the CCD 1003 cannot be reduced.

In attempting to solve the problem, a CCD pulse generator capable of generating a CCD driving signal and a CCD output processing signal at accurate timings is proposed. The pulse generator includes a digital delay type pulse control section which finely delays a transfer signal for driving a CCD, thereby generating a plurality of delay signals, and changes selection of these delay signals, thereby generating a CCD driving signal and/or a CCD output processing signal corresponding to the predetermined rise and fall timings, an inverted/non-inverted signal generating section which generates the inverted signal and non-inverted signal of the generated signal, a selection section which selects the turned-over signal and unturned-over signal of the generated signal, a blanking section which temporarily disables the generated signal, an output section which has an output enable function and outputs the signal selected by the selection section, and an output signal condition setting section which sets pieces of condition setting information that determine the operations of the respective sections. By finely delaying a transfer signal for driving a CCD to generate multiple delay signals, and changing selection of the multiple delay signals, it becomes possible to generate CCD driving signals (such as CCD reset signals, CCD clamp signals, and preliminary signals) and CCD output processing signals (such as sampling signals) corresponding to the predetermined rise and fall timings.

However, the above-mentioned CCD pulse generator cannot solve the problem of optimizing the signal timings at the CCD terminal, and it is difficult for the CCD pulse generator to drive a CCD at a high speed.

For these reasons, the present inventors recognized that there is a need for a photoelectric conversion device capable of performing high speed CCD driving.

SUMMARY

This patent specification describes a novel photoelectric conversion device, one embodiment of which includes a photoelectric conversion element configured to convert light reflected from an original image to electrical signals, and a clock generator configured to generate driving signals for driving the photoelectric conversion element, wherein each of the driving signals is generated using the same logic gate or a logic gate of the same type (i.e., substantially the same logic gate).

This patent specification further describes a novel sensor control circuit, one embodiment of which includes a timing generator configured to generate a reference signal, and the above-mentioned photoelectric conversion device configured to convert light reflected from an original image to electrical signals in the photoelectric conversion element while generating driving signals from the reference signal in the clock generator.

This patent specification further describes a novel image reading device, one embodiment of which includes a light source configured to emit light toward an original image, and the above-mentioned sensor control circuit configured to generate digital image signals according to the original image.

This patent specification further describes a novel image forming apparatus, one embodiment of which includes the above-mentioned image reading device configured to read an original image to generate digital image signals according to the original image, and an image forming device configured to form a visible image on a sheet using the digital image signals.

BRIEF DESCRIPTION OF THE DRAWINGS

A more complete appreciation of the aspects of the invention and many of the attendant advantage thereof will be readily obtained as the same better understood by reference to the following detailed description when considered in connection with the accompanying drawings, wherein:

FIG. 4 is a timing chart illustrating signals generated by the clock generator illustrated in FIG. 3;

DESCRIPTION OF THE PREFERRED EMBODIMENTS

The photoelectric conversion device of the present invention is characterized in that only a reference clock, which is a reference for signal generation, is input to a CCD to internally generate driving signals from the reference clock using the same kind of logic gate (i.e., substantially the same logic gate).

Embodiments of the present invention will be described.

First Embodiment

Figure 1:
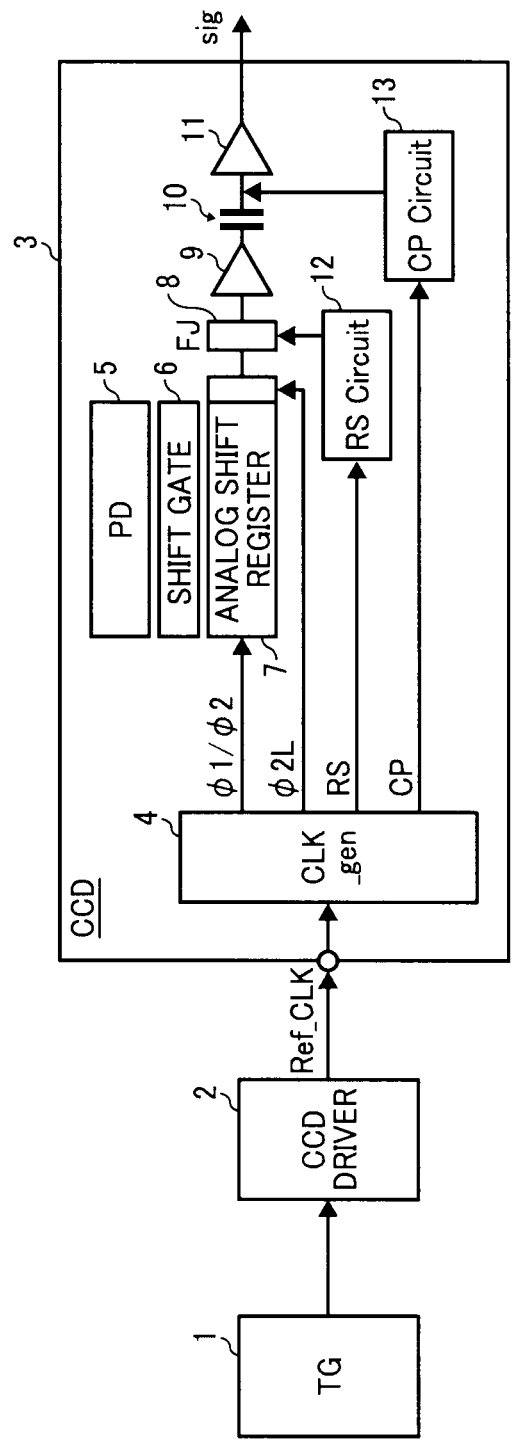
FIG. 1 is a block diagram illustrating an example of the image reading device of the present invention.

FIG. 1 is a block diagram illustrating an example of the image reading device (scanner) of the present invention.

The scanner illustrated in FIG. 1 has such configuration as to generate driving signals from a reference signal (Ref_CLK) input to a CCD 3. The thus-generated driving signals are supplied to the corresponding portions to drive the CCD 3.

The CCD 3 includes a clock generator (CLK_gen) 4, a photodiode (PD) 5, a shift gate 6, an analogue shift register 7, a floating capacitor (FJ) 8, buffer circuits 9 and 11, a condenser 10, a RS circuit 12, and a CP circuit 13.

In the scanner having such configuration, the timing of the driving signals generated therein is hardly affected by various factors present between a TG 1 to the CCD 3 such as signal skews in a timing generator (TG) 1 and a CCD driver 2, variation of resistors and capacitors, parasitic components of a transmission line (e.g., resistor/capacitor/inductor components), and capacitance of the terminal of the CCD 3, resulting in dramatic reduction of variation in timing of the CCD driving signals.

Second Embodiment

Figure 2:
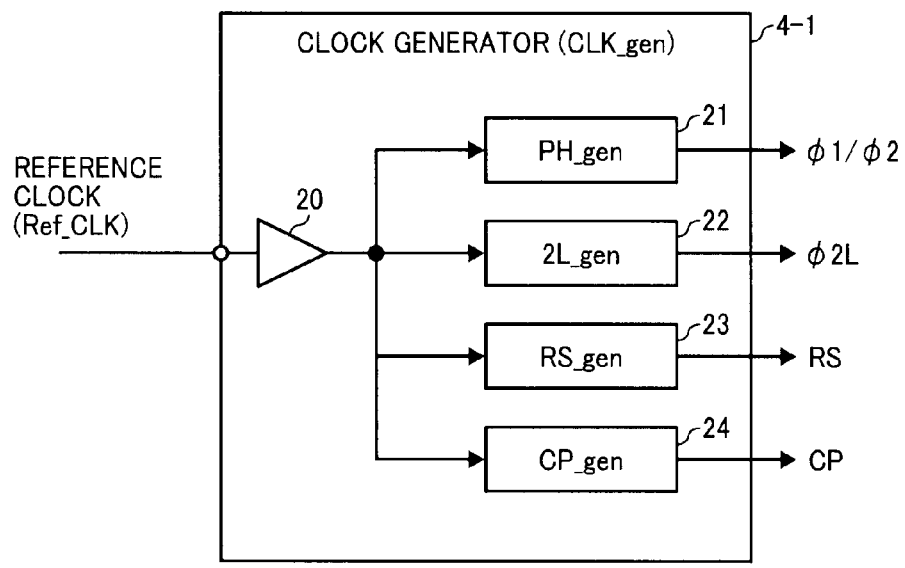
FIG. 2 is a block diagram illustrating a clock generator for use in the image reading device of the present invention.

FIG. 2 is a block diagram illustrating a clock generator for use in the image reading device of the present invention.

Referring to FIG. 2, when a reference clock (Ref_CLK) is input to a clock generator (CLK_gen) 4-1 via a buffer circuit 20, first driving signal generator (PH_gen) 21, second driving signal generator (2L_gen) 22, third driving signal generator (RS_gen) 23, and fourth driving signal generator (CP_gen) 24 generate driving signals φ1/φ2, φ2L, RS and CP, respectively.

In the clock generator 4-1, the buffer circuit 20 is provided before the driving signal generators 21-24 to reduce driving load on the generators. However, when the driving signal generators have no problem with respect to the driving load, it is not necessary to use the buffer 20.

Third Embodiment

Figure 3:
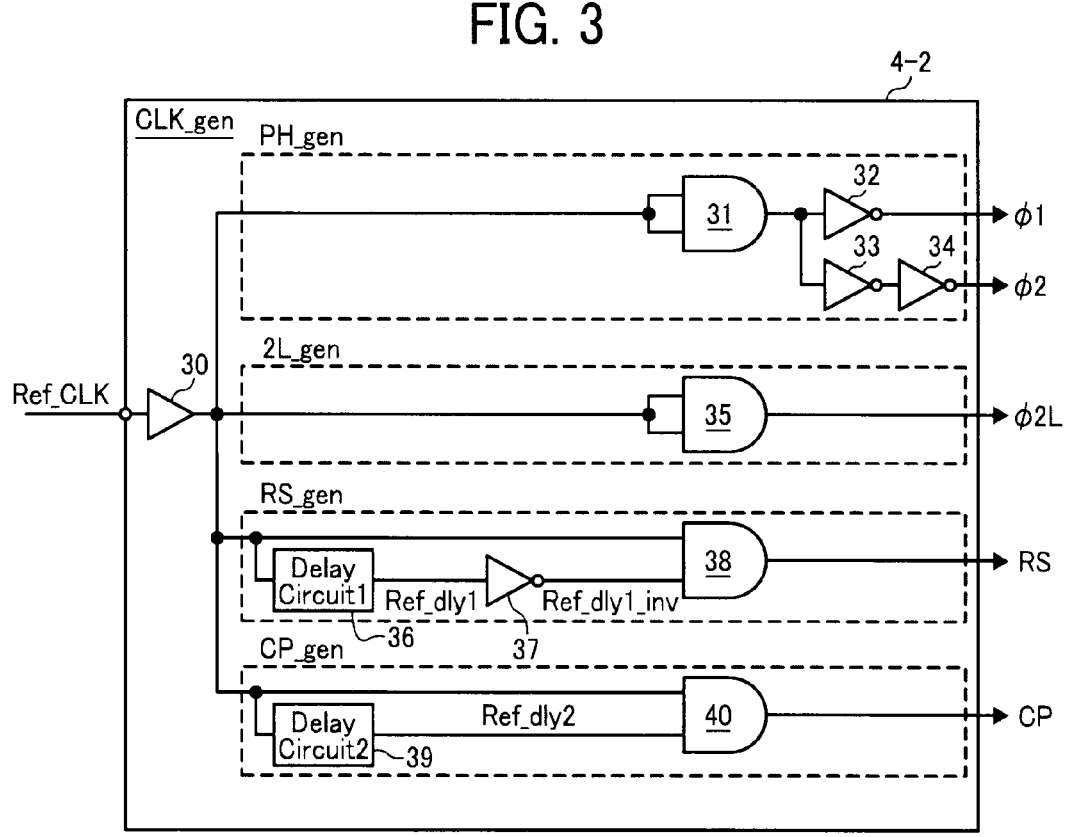
FIG. 3 is a detail view of the clock generator illustrated in FIG. 2.

FIG. 3 is a detail view of the clock generator illustrated in FIG. 2. FIG. 4 is a timing chart illustrating signals generated by the clock generator illustrated in FIG. 3.

In FIG. 4, waveforms of the signals Ref_CLK, φ1, φ2, φ2L, Ref_dly1, Ref_dly1_inv, RS, Ref_dly2, and CP are illustrated while time is plotted on the horizontal axis.

When a clock generator (CLK_gen) 4-2 is built into the CCD 3, variation in timing can be dramatically reduced. However, if the variation in each signal generator is too large, the variation in timing cannot be reduced.

Therefore, in order to generate driving signals while minimizing variation in the signal generators, in the present embodiment the signal generators generate the driving signals using the same logic gate.

As illustrated in FIG. 3, the signal φ2L is a buffered reference signal Ref_CLK.

Figure 12A:
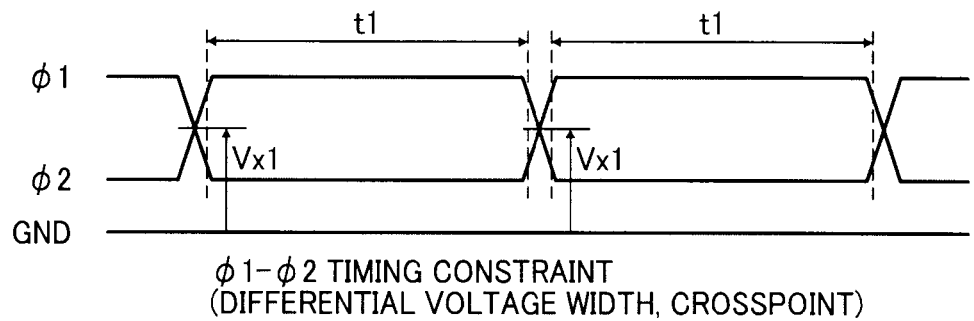
FIG. 12A illustrates timing constraints on φ1 and φ2 (differential voltage width, and crosspoint)
Figure 12B:
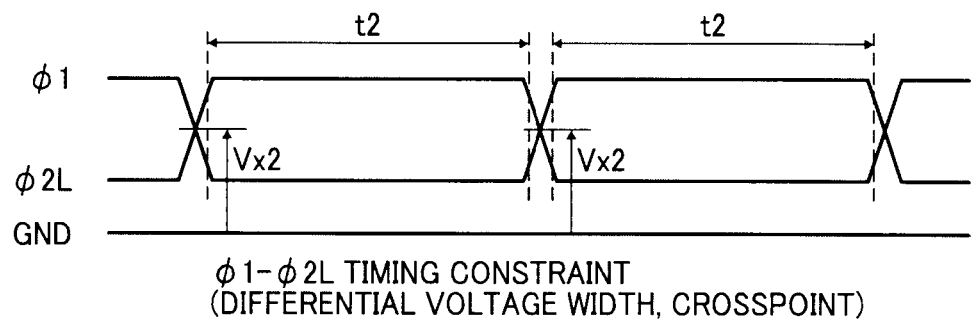
FIG. 12B illustrates timing constraints on φ1-φ2L (differential voltage width, and crosspoint)
Figure 12C:
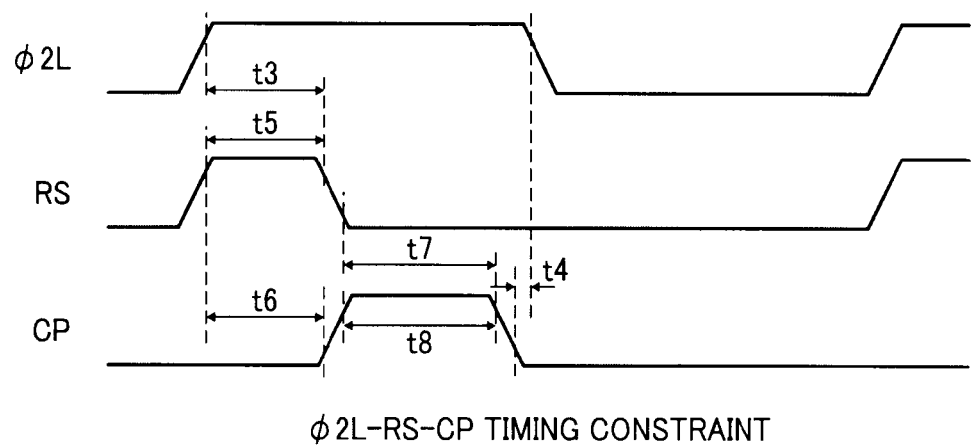
FIG. 12C illustrates timing constraints on φ2L, RS and CP.
Figure 13A:
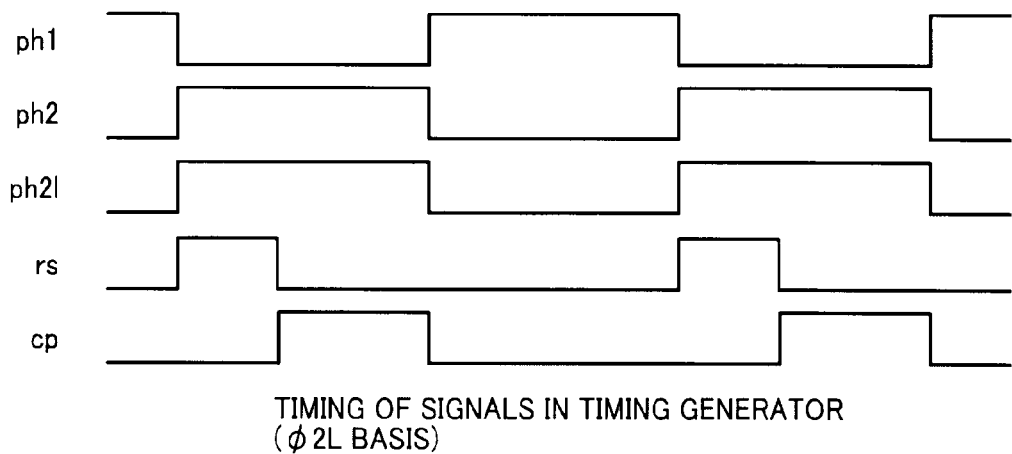
FIGS. 13A and 13B are timing charts illustrating signals at different points of a related-art image reading device.
Figure 13B:
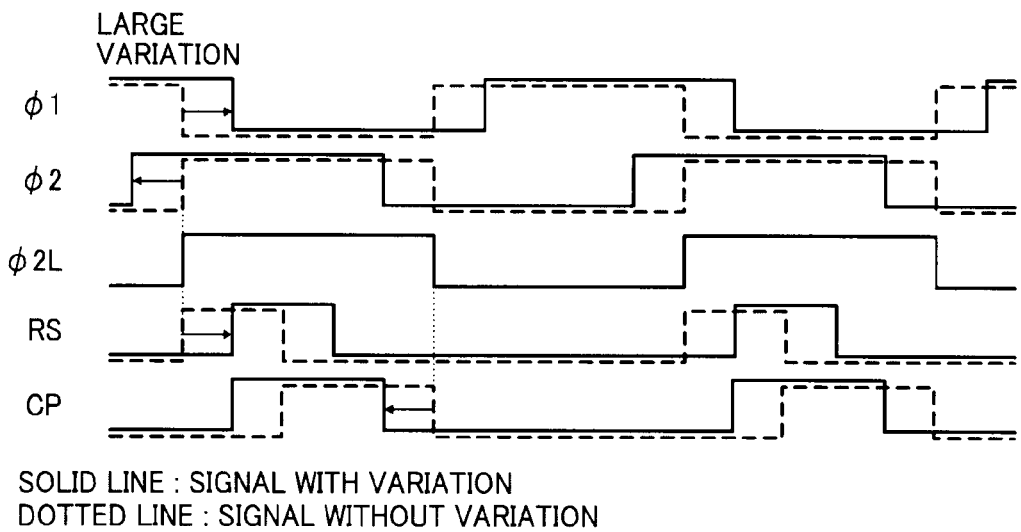

In this regard, AND gates 31 and 35 are used as buffers, and the reference clock signal Ref_CLK is divided in two and fed to the AND gates 31 and 35. Since the driving signal φ2L has timing constraints with almost all the other driving signals as illustrated in FIG. 12, the clock generator (CLK_gen) 4-2 has φ2L-basis configuration (although the configuration is not limited thereto). Therefore, since the reference clock Ref_CLK is φ2L-equivalent, the duty ratio of the HIGH/LOW widths is set to 50/50.

The RS signal is generated by processing the reference clock Ref_CLK and an inverted signal, which is generated in an inverter 37 by reversing a delay signal (Ref_dly1) generated by delaying the reference clock Ref_CLK using a first delay circuit 36 (such as resistors and condensers), in an AND gate 38. Therefore, the rise position of the RS signal is determined depending on the rise property of the reference clock Ref_CLK, and the fall position of the RS signal is determined depending on the rise property of the reference clock Ref_CLK and the amount of delay of the delay circuit 36.

The CP signal is generated similarly to the RS signal except that the inverter 37 is not used for generating the CP signal. Specifically, the rise position of the CP signal is determined depending on the rise property of the reference clock Ref_CLK and the amount of delay of a delay circuit 39, and the fall position of the CP signal is determined depending on the fall property of the reference clock Ref_CLK. In FIG. 3, numeral 40 denotes an AND gate.

In this regard, the amounts of delay of the delay circuits 36 and 39 may be different from each other. However, the amounts of delay of the delay circuits are preferably equalized to reduce variation. Namely, it is preferable to use delay circuits having the same configuration for the delay circuits 36 and 39.

When generating the signals φ1 and φ2, at first the reference signal Ref_CLK is buffered in an AND circuit 31 similarly to the signal φ2L. The signal φ1 is generated by inverting the buffered signal using an inverter 32, and the signal φ2 is generated by performing two-step inverting processings on the buffered signal using two inverters 33 and 34 to normalize the signal.

In the clock generator 4-2 illustrated in FIG. 3, all the driving signals are generated using the same kind of gate (AND gate in this case). Specifically, since the timings of all the driving signals are determined depending on the delays of the AND gates 31, 35, 38 and 40 relative to the reference clock Ref_CLK, the timings between two signals (i.e., φ1↓-φ2↑, φ1↑-φ2L↓, φ2L↑-RS↑, φ2L↓-CP↓ (i.e., t4 in FIG. 12C)) can be substantially synchronized, and thereby the driving signals can be generated with little variation as illustrated in FIG. 4.

Although the gates are of the same kind, the delay times thereof are not necessarily the same (strictly speaking, slight skew is present therein).

However, since the gates are constructed on the same semiconductor chip, and the properties thereof vary in the same direction (i.e., the properties are tracking), variation in delay time caused by the gates is small. Specifically, the variation in delay time in this clock generator is about one-tenth of the above-mentioned variation (on the order of about ±several nanoseconds) caused by the above-mentioned factors present between a TG and a CCD.

As mentioned above, the timings between two signals, φ1↓-φ2L↑ and φ1↑-φ2L↓, can be controlled with small variation, and therefore the crosspoint (Vx2 in FIG. 12) and differential voltage width (t2 in FIG. 12) can be easily secured.

In addition, the width of a HIGH period of the signal RS (t5 in FIG. 12) and the period $RS_\downarrow$-$CP_\downarrow$ (t7) are determined depending on the amount of delay (for example, on the order of about 3 to 5 nanoseconds) of the delay circuit (plus inverter) of the RS generating circuit. For example, the sum of the above-mentioned signal periods (i.e., t5+t7) has to fall within the HIGH period of the signal ϕ2L. In this regard, the variation factor therefor is only one delay circuit, and therefore the signals can be generated with smaller variation than that in a conventional case where multiple factors of the above-mentioned variation factors are accumulated.

Since the signals $\phi 2L_\uparrow$-$RS_\uparrow$ can be timed to each other in this embodiment, the period $\phi 2L_\uparrow$-$RS_\downarrow$ (t3 in FIG. 12) becomes identical to the width (t5) of the HIGH period of the signal RS. The variation factor therefor is only one delay circuit of the RS generating circuit, and therefore the signals can be generated with small variation.

Similarly, the period $RS_\uparrow$-$CP_\uparrow$ (t6) is determined depending on the amount of delay of the delay circuit of the CP generating circuit. Since this embodiment has a configuration such that the $CP_\uparrow$ necessarily delays relative to the $RS_\uparrow$, the timing constraint can be automatically satisfied. Since the variation factor for the width of a HIGH period of the CP (t8 in FIG. 12) is only one delay circuit of the CP generating circuit, the signals can be generated with small variation.

In contrast, the periods, $\phi 1_\uparrow$-$\phi 2_\downarrow$ and $\phi 1_\downarrow$-$\phi 2_\uparrow$, vary in an amount equal to the delay time of one inverter. However, since the load on ϕ1 and ϕ2 is generally large (because analog shift registers corresponding to thousands of pixels have to be driven) and the signal wave becomes blunt, the delay time of the inverter is negligible. Therefore, the crosspoint Vx1 of ϕ1-ϕ2 can be easily satisfied.

Figure 5A:
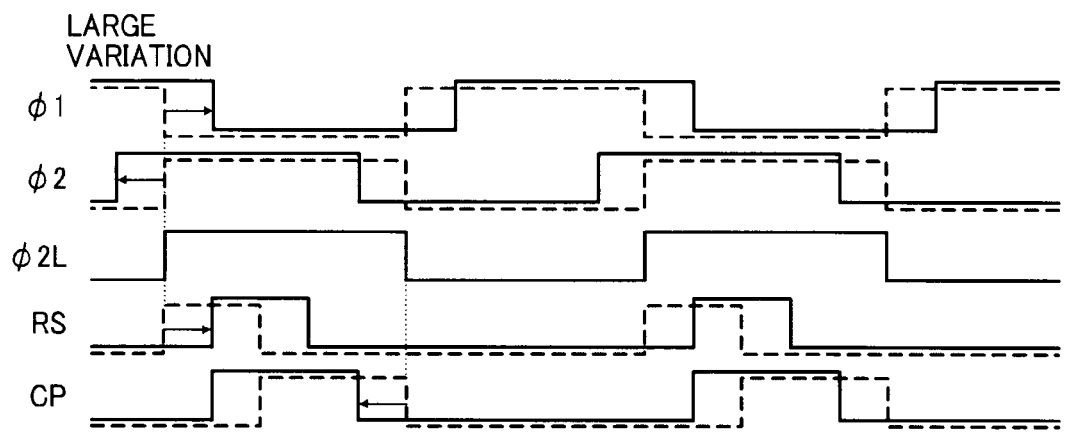
FIG. 5A is a timing chart illustrating signals generated in a related-art image reading device.
Figure 5B:
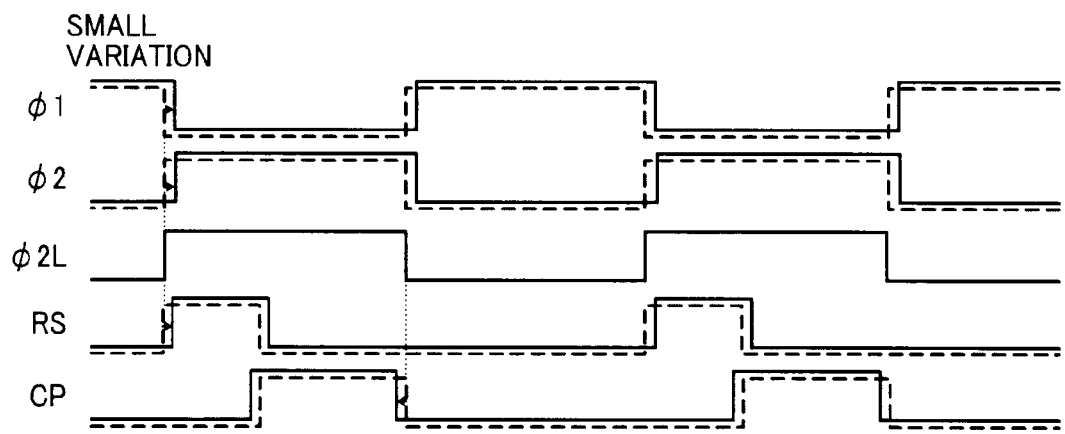
FIG. 5B is a timing chart illustrating signals generated in an example of the image reading device of the present invention.

FIG. 5A is a timing chart illustrating signals generated in a related-art image reading device, and FIG. 5B is a timing chart illustrating signals generated in an example of the image reading device of the present invention.

In FIGS. 5A and 5B, waveforms of the signals ϕ1, ϕ2, ϕ2L, RS and CP are illustrated while time is plotted on the horizontal axis. The solid lines represent signals with variation, and the broken lines represent signals without variation.

Since the signals are not affected by the variation factors present between a TG and a CCD in the image reading device of the present invention, the signals can be generated with small variation as illustrated in FIG. 5B.

Fourth Embodiment

Figure 6:
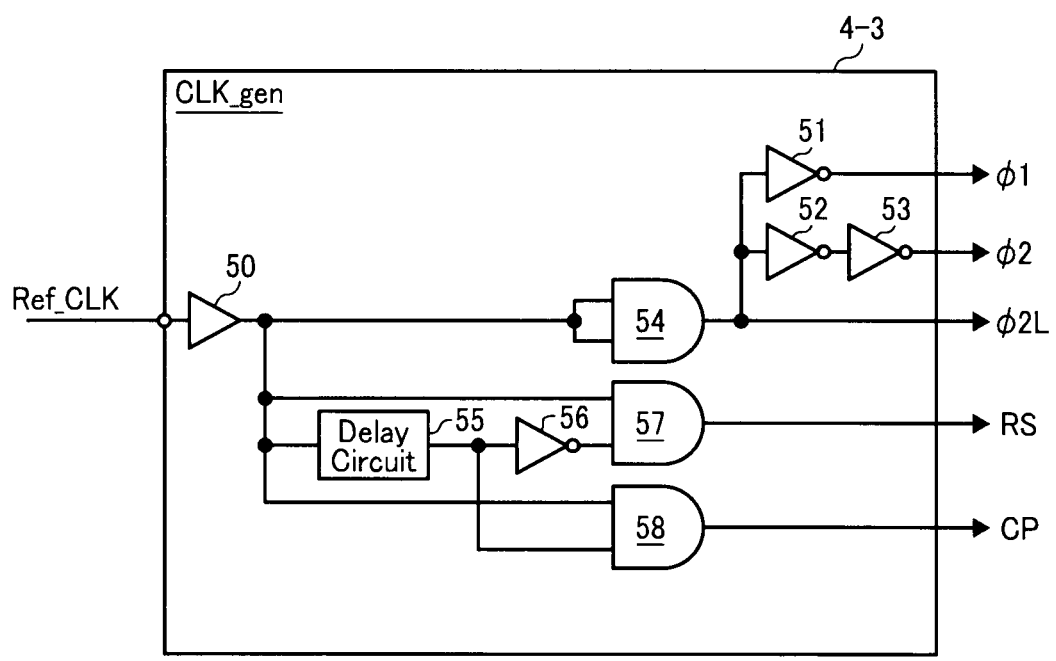
FIG. 6 is a block diagram illustrating another clock generator which is a modified version of the clock generator illustrated in FIG. 3.

FIG. 6 is a block diagram illustrating another clock generator which is a modified version of the clock generator illustrated in FIG. 3.

Referring to FIG. 6, a clock generator 4-3 includes a buffer 50, inverters 51-53 and 56, a delay circuit 55, and AND gates 54, 57 and 58.

The clock generator 4-3 illustrated in FIG. 6 is different from the clock generator 4-2 illustrated in FIG. 3 in that the AND gate 54 and delay circuit 55 are shared, resulting in reduction in the number of components.

Figure 7A:
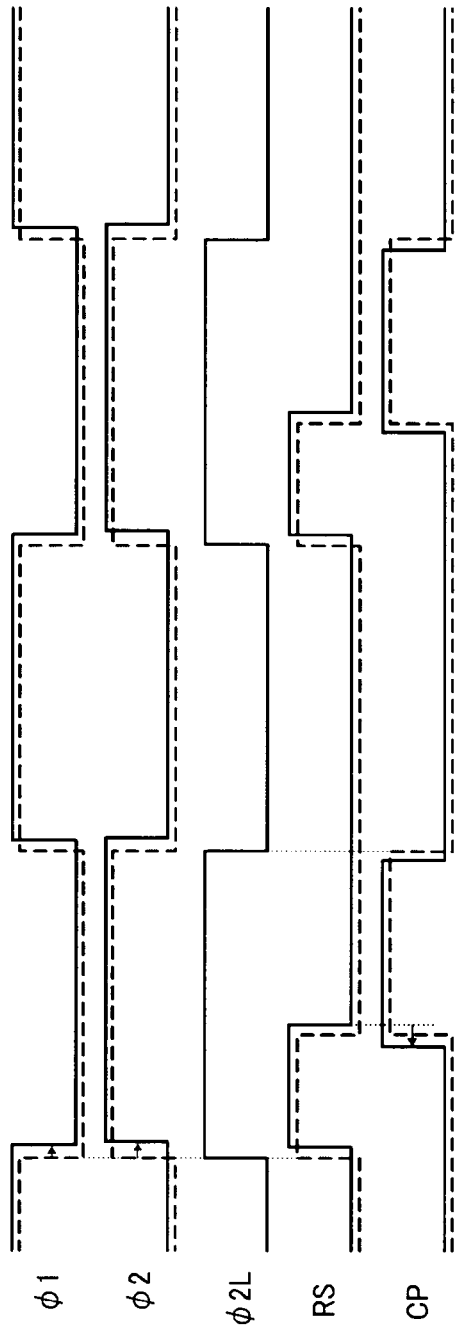
FIG. 7A is a timing chart illustrating signals generated in an example of the image reading device of the present invention using the clock generator illustrated in FIG. 3.
Figure 7B:
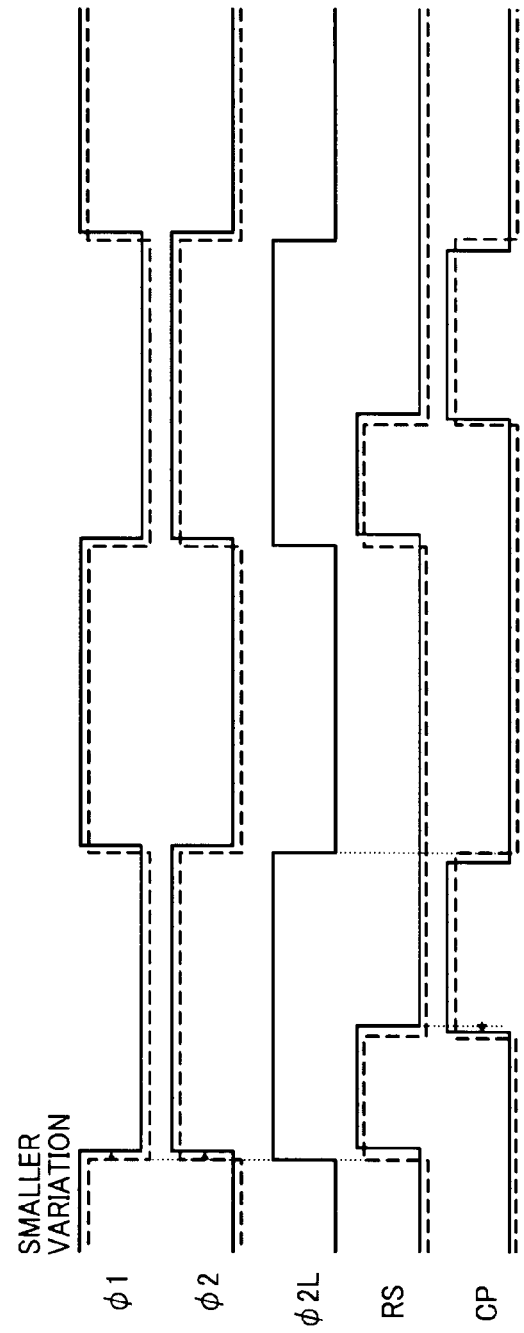
FIG. 7B is a timing chart illustrating signals generated in another example of the image reading device of the present invention using the clock generator illustrated in FIG. 6.

FIG. 7A is a timing chart illustrating signals generated in an example of the image reading device of the present invention using the clock generator illustrated in FIG. 3. FIG. 7B is a timing chart illustrating signals generated in another example of the image reading device of the present invention using the clock generator illustrated in FIG. 6.

In FIGS. 7A and 7B, waveforms of the signals ϕ1, ϕ2, ϕ2L, RS and CP are illustrated while time is plotted on the horizontal axis.

There is a timing constraint between the signals ϕ1 and ϕ2L. In addition, referring to FIG. 3, a portion of the ϕ1 and ϕ2 generating circuits, in which the reference clock Ref_CLK is buffered by the AND gate 31, is the same as a portion of the ϕ2L generating circuit, in which the reference clock Ref_CLK is buffered by the AND gate 35.

Therefore, the portion in which the reference clock Ref_CLK is buffered by an AND gate is shared in the clock generator illustrated in FIG. 6. Since there is no skew between the AND gate of the ϕ1 and ϕ2 generating circuits and the AND gate of the ϕ2L generating circuit in this clock generator, the signals are not affected by skew in this clock generator. Therefore, variation in timing between the signals ϕ1 and ϕ2 and the signal ϕ2L can be further reduced in the clock generator illustrated in FIG. 6.

Similarly, the delay clocks Ref_delay1 and Ref_delay2 of the reference clock Ref_CLK in the RS and CP generating circuits illustrated in FIG. 3 are equivalent in signal to each other. Therefore, by sharing the portion of the circuits, variation in timing between signals $RS_\downarrow$-$CP_\uparrow$ can be further reduced.

Fifth Embodiment

Figure 8:
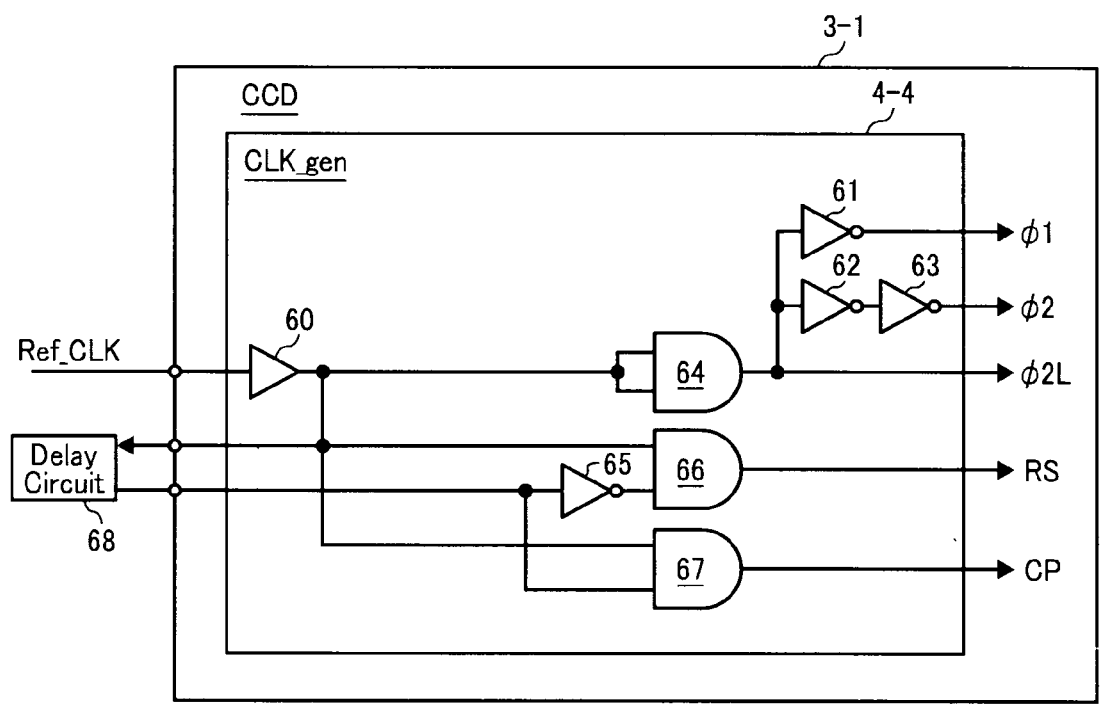
FIG. 8 is a block diagram illustrating another clock generator having a delay circuit arranged outside.

FIG. 8 is a block diagram illustrating another clock generator having an external delay circuit.

Referring to FIG. 8, a clock generator 4-4 includes a buffer 60, inverters 61-63 and 65, and AND gates 64, 66 and 67.

When the delay circuit 55 illustrated in FIG. 6, which is a RC circuit, is provided in a CCD 3-1, it is possible that the amount of delay varies by tens of percent. When the clock generator has a configuration such that a delay circuit 68 is arranged outside as illustrated in FIG. 8, outside parts with high precision can be used for the delay circuit, thereby further reducing variation in delay time.

Sixth Embodiment

An image forming apparatus according to an embodiment of the present invention will be described.

Figure 9:
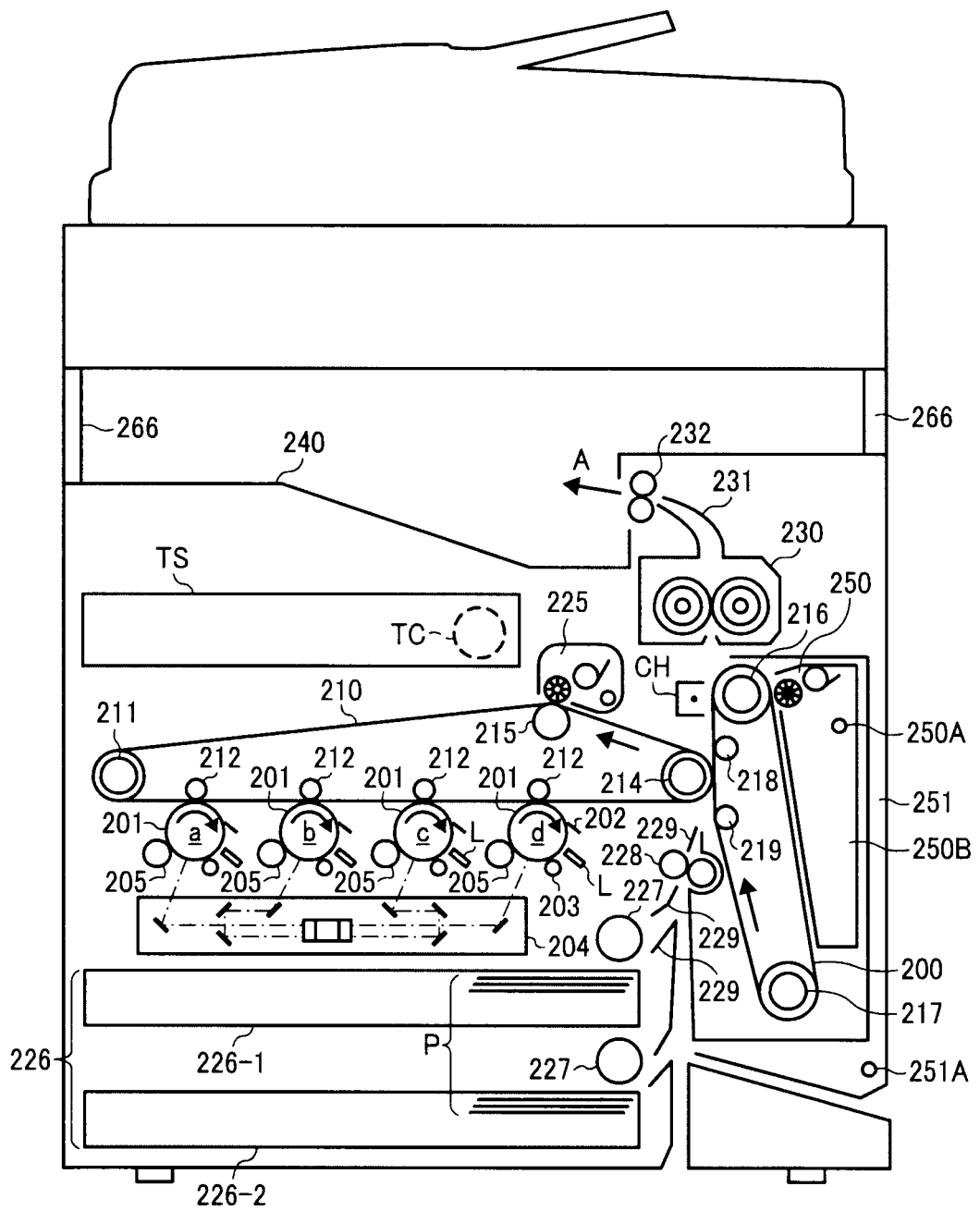
FIG. 9 is a schematic view illustrating an example of the image forming apparatus of the present invention.
Figure 10:
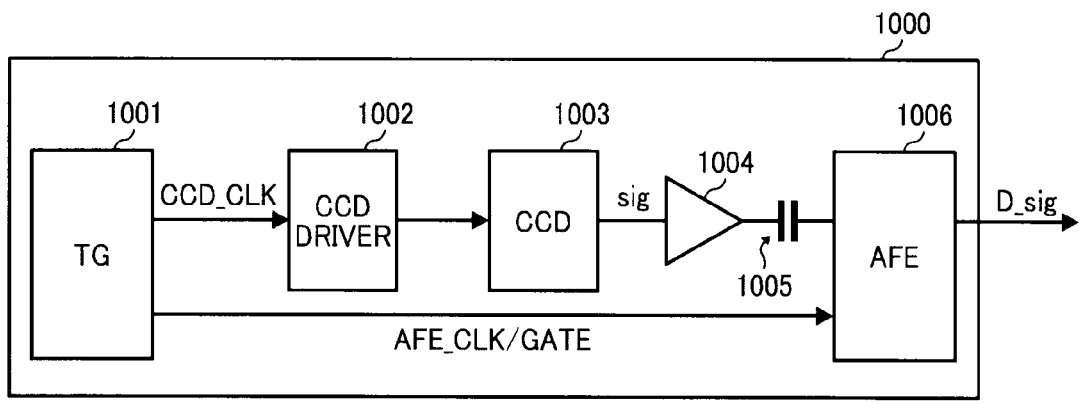
FIG. 10 is a block diagram illustrating flow of signals in a sensor board unit for use in a related-art image reading device.
Figure 11:
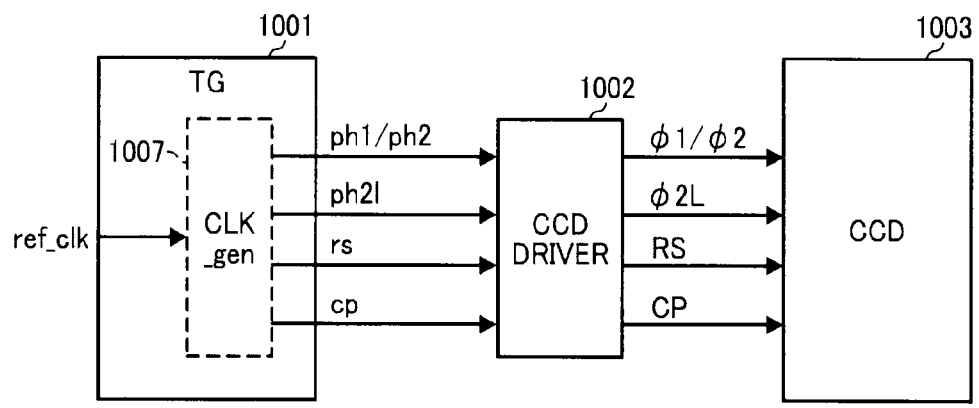
FIG. 11 a block diagram illustrating a related-art image reading device.

FIG. 9 is a schematic view illustrating an example of the image forming apparatus of the present invention.

The image forming apparatus includes four image forming units each including a photoreceptor 201 serving as an image bearing member, which rotates in a direction indicated by an arrow. In addition, each image forming unit includes a discharging device L, a cleaning device 202, a charging device 203, and a developing device 205, which are arranged around the photoreceptor 201.

There is a space between the charging device 203 and the developing device 205 so that a light beam having image information and emitted from a light irradiating device 204 passes through the space to irradiate the surface of the photoreceptor 201, which is previously charged by the charging device 203, resulting in formation of an electrostatic latent image on the photoreceptor.

The image forming units are the same. Only the color of the toner contained in the developing device 205 and used for developing an electrostatic latent image on the photoreceptor is different.

The photoreceptor 201 has configuration such that a photosensitive layer including an organic semiconductor serving as a photoconductive material is formed on an aluminum cylinder with a diameter of from 30 mm to 100 mm, and part of the photoreceptor is contacted with a first intermediate transfer belt 210 serving as a first visible image bearing member.

The first intermediate transfer belt 210 is supported by rotating rollers 211, 212, 213 and 214 while stretched thereby in such a manner as to be rotatable in a direction indicated by an arrow. The rollers 212, which also serve as first transfer members, are arranged in the vicinity of the respective photoreceptors while contacted with the backside (i.e., inside of the loop) of the first intermediate transfer belt 210 to transfer a visible image (hereinafter referred to as a toner image) on the photoreceptor 201 onto the first intermediate transfer belt 210.

The toner image on the first intermediate transfer belt 210 is then transferred onto a receiving material or a second intermediate transfer belt 200 serving as a second visible image bearing member at a transfer nip between the first and second intermediate transfer belts 210 and 200. A belt cleaning device 250 for cleaning the surface of the second intermediate transfer belt 200 is provided downstream from the transfer nip relative to the moving direction of the second intermediate transfer belt indicated by an arrow. The cleaning device 250 has a brush roller to remove residual materials (such as toner particles) from the second intermediate transfer belt 200 after the toner image formed on the second intermediate transfer belt 200 is transferred onto a receiving material. In addition, another cleaning device 225 for cleaning the surface of the first intermediate transfer belt 210 is provided on a downstream side of the belt from the transfer nip relative to the moving direction of the first intermediate transfer belt. The cleaning device 225 has a brush roller to remove residual materials (such as toner particles) from the first intermediate transfer belt 210 after the toner image thereon is transferred onto the second intermediate transfer belt 200 or a receiving material.

Although the brush roller of the cleaning device 250 is separated from the surface of the second intermediate transfer belt 200 in FIG. 9, the brush roller can swing on a hinge 250A so as to be attached to or detached from the surface of the second intermediate transfer belt 200. Specifically, when the second intermediate transfer belt 200 bears a toner image thereon, which is transferred from the first intermediate transfer belt 210, the brush roller is detached from the surface of the second intermediate transfer belt. After the toner image is transferred onto a receiving material, the brush roller is swung counterclockwise so as to be attached to the surface of the second intermediate transfer belt 200 to remove residual toner particles from the surface. The collected residual toner particles are contained in a container 250B.

The light irradiating device 204 is a known light irradiating device, and irradiates the charged surface of the photoreceptor 201 with a laser beam including image information (such as full color image information of an original image) to form an electrostatic latent image corresponding to the original image on the photoreceptor. The light irradiating device 204 is not limited to such a laser type light irradiating device, and light irradiating devices including a LED array and a focusing device can also be used therefor.

The above-mentioned photoreceptor 201, cleaning device 202, charging device 203, light irradiating device 204, developing device 205, discharging device L, and first transfer members 212 serve as an image forming device for forming a toner image on the first intermediate transfer belt 210.

In this embodiment, the first intermediate transfer belt 210 is a belt having a substrate, which is made of a film of a resin or rubber and which has a thickness of from 50 μm to 600 μm.

The first intermediate transfer belt 210 has an electric resistance such that a toner image can be well transferred thereon from the photoreceptor 201.

The second intermediate transfer belt 200 (i.e., second visible image bearing member) provided on the right side of the first intermediate transfer belt 210 in FIG. 9 is supported by rotating rollers 216, 217, 218 and 219 while stretched thereby in such a manner as to be rotatable in the direction indicated by the arrow. The rollers 218 and 219 arranged on the backside (inside of the loop) of the second intermediate transfer belt 200 also serve as second transfer members. In addition, the belt cleaning device 250, and a charger CH are arranged outside the loop of the second intermediate transfer belt 200.

The second transfer member, i.e., the rollers 218 and 219, and the roller 214 supporting the first intermediate transfer belt 210 contacts the second intermediate transfer belt 200 with the first intermediate transfer belt, resulting in formation of the transfer nip.

In this embodiment, the second intermediate transfer belt 200 is a belt having a substrate, which is made of a film of a resin or rubber and which has a thickness of from 50 μm to 600 μm. The second intermediate transfer belt 200 has an electric resistance such that a toner image can be well transferred thereon from the first intermediate transfer belt 210.

Sheets of a receiving material P are contained in cassettes 226-1 and 226-2 of a receiving material feeding device 226. In a sheet feeding operation, an uppermost sheet in one of the cassettes 226-1 and 226-2 is fed one by one by a feed roller 227 so as to be fed to a pair of registration rollers 228 along multiple guides 229.

Downstream from the transfer nip relative to the sheet feeding direction, a fixing device 230, a pair of discharging guides 231, a pair of discharging rollers 232, and a copy stacking portion 240 are provided.

A supplementary toner containing portion TS is provided above the first intermediate transfer belt 210 and below the copy stacking portion 240. The toner containing portion TS can contain four toner cartridges TC, i.e., magenta, cyan, yellow and black toner cartridges, from which supplementary magenta, cyan, yellow and black toners are timely supplied to the respective developing devices 205 using powder pumps or the like.

A frame 251 of the main body of the image forming apparatus can rotate on a hinge 251A to allow access the interior of the main body. By opening the frame 251, the passage of the sheet can be widely exposed, and therefore a jammed sheet can be easily removed from the sheet passage.

The above-mentioned image reading device of the present invention is provided on the main body of the image forming apparatus via a support 266. Image data obtained by reading an original image with the image reading device are sent to the main body so that the image forming device prints the image on the receiving material sheet P in the main body, resulting in formation of a copy.

Since the image reading device is described above, description thereof is omitted here.

On a peripheral portion of the image reading device, an operation/display device (i.e., inputting and displaying device) is provided. The operation/display device includes a touch panel, which displays operational information for the user and from which the user inputs operational information, and buttons such as ten keys.

The user performs various operations such as switching between one-side printing mode and duplex printing mode, start of printing, setting of the number of copies, and switching between copying function and printing function using the operation/display device.

According to the present invention, the CCD driving timing can be optimized and minimally affected by variation factors present between a timing generator and a CCD, and therefore high speed CCD driving can be performed.

The present invention can be preferably used for a high speed CCD driving technique for use in image reading devices (scanners) and image forming apparatuses equipped with an image reading device (such as copiers, and multifunctional products having two or more of copying, facsimileing and printing functions).

Additional modifications and variations of the present invention are possible in light of the above teachings. It is therefore to be understood that within the scope of the appended claims the invention may be practiced other than as specifically described herein.

This document claims priority and contains subject matter related to Japanese Patent Application No. 2009-202460, filed on Sep. 2, 2009, the entire contents of which are herein incorporated by reference.

What is claimed is:

1. A photoelectric conversion system comprising:
a timing generator configured to generate a timing signal;
a CCD driver configured to generate a reference clock based on the timing signal; and
a photoelectric conversion device including:
a photoelectric conversion element configured to convert light reflected from an original image to electrical signals, and
a clock generator configured to generate a plurality of driving signals for driving the photoelectric conversion element from the reference clock, each of the driving signals being generated using the same type of logic gate.

2. The photoelectric conversion system according to claim 1, wherein the clock generator generates two of the driving signals having a timing constraint using the same signal.

3. The photoelectric conversion system according to claim 1, wherein the clock generator buffers the reference clock and generates the driving signals using the buffered reference clock.

4. The photoelectric conversion system according to claim 1, further comprising a delay circuit external to the clock generator, wherein the clock generator generates the driving signals using the delay circuit.

5. An image reading device comprising:
a light source configured to emit light toward an original image; and
the photoelectric conversion system according to claim 1, configured to generate digital image signals according to the original image.

6. An image forming apparatus comprising:
the image reading device according to claim 5, configured to read an original image to generate digital image signals; and
an image forming device configured to form a visible image on a sheet using the digital image signals.

7. A photoelectric conversion system comprising:
timing signal generating means for driving a CCD driver;
reference clock generating means for driving a photoelectric conversion device;
photoelectric conversion means for converting light reflected from an original image to electrical signals; and
clock generating means for generating driving signals for driving a photoelectric conversion element of the photoelectric conversion device, from a generated reference clock, each of the driving signals being generated using the same type of logic gate.

8. A photoelectric conversion device comprising:
a photoelectric conversion element configured to convert light reflected from an original image to electrical signals; and
a clock generator configured to receive a reference clock from a CCD driver, the reference clock being generated based on a timing signal transmitted by a timing generator to the CCD driver, and to generate a plurality of driving signals for driving the photoelectric conversion element based on the second reference clock, each of the driving signals being generated using the same type of logic gate.

9. The photoelectric conversion system according to claim 1, wherein the clock generator generates each of the driving signals using an AND type logic gate.

10. The photoelectric conversion system according to claim 1, wherein the clock generator further comprises a delay circuit configured to delay a subset of signals of the plurality of driving signals generated by the clock generator.

* * * * *